US007608225B2

(12) United States Patent
Schulz Van Endert et al.

(10) Patent No.: US 7,608,225 B2
(45) Date of Patent: Oct. 27, 2009

(54) TOWER REACTOR AND USE THEREOF FOR THE CONTINUOUS PRODUCTION OF HIGH MOLECULAR WEIGHT POLYESTERS

(75) Inventors: Eike Schulz Van Endert, Berlin (DE); Christian Atlas, Berlin (DE)

(73) Assignee: Uhde Inventa-Fisher GmbH, Berlin (DE)

( * ) Notice: Subject to any disclaimer, the term of this patent is extended or adjusted under 35 U.S.C. 154(b) by 177 days.

(21) Appl. No.: 10/573,937

(22) PCT Filed: Oct. 29, 2004

(86) PCT No.: PCT/EP2004/012297

§ 371 (c)(1), (2), (4) Date: Sep. 13, 2006

(87) PCT Pub. No.: WO2005/042615

PCT Pub. Date: May 12, 2005

(65) Prior Publication Data

US 2007/0116615 A1 May 24, 2007

(30) Foreign Application Priority Data

Oct. 31, 2003 (DE) ................. 103 51 085

(51) Int. Cl.
*B01J 19/00* (2006.01)
*C08F 2/00* (2006.01)
(52) U.S. Cl. .............. 422/131; 422/134; 422/135; 422/138; 526/65; 261/114.1; 261/114.4
(58) Field of Classification Search ............. 422/131, 422/134, 135, 138; 526/65; 261/114.1, 114.4
See application file for complete search history.

(56) References Cited

U.S. PATENT DOCUMENTS

| 2,761,889 | A | * | 9/1956 | May et al. ............... 585/529 |
| 4,289,895 | A | | 9/1981 | Burkhardt et al. |
| 4,680,376 | A | | 7/1987 | Heinze et al. |
| 5,310,955 | A | | 5/1994 | Shirtum et al. |
| 5,469,914 | A | * | 11/1995 | Davison et al. ............. 165/166 |
| 5,779,986 | A | | 7/1998 | Van Endert et al. |

(Continued)

FOREIGN PATENT DOCUMENTS

DE 3544551 A1 6/1987

(Continued)

OTHER PUBLICATIONS

PCT International Search Report for PCT/EP2004/012297 completed by the European Searching Authority on Feb. 24, 2005.

(Continued)

*Primary Examiner*—Walter D Griffin
*Assistant Examiner*—Natasha Young
(74) *Attorney, Agent, or Firm*—Barnes & Thornburg LLP

(57) ABSTRACT

The invention relates to a tower reactor and the use thereof for producing high-molecular weight polyesters, such as e.g. polyethylene terephthalate (PET), polybutylene terephthalate (PBT), polynaphthalene terephthalate (PEN), polytrimethylene terephthalate (PTT) and/or polyesters of other dicarboxylic acids and diols including copolymers thereof. It thereby concerns a single-stage tower reactor.

31 Claims, 7 Drawing Sheets

U.S. PATENT DOCUMENTS

Figure 1:
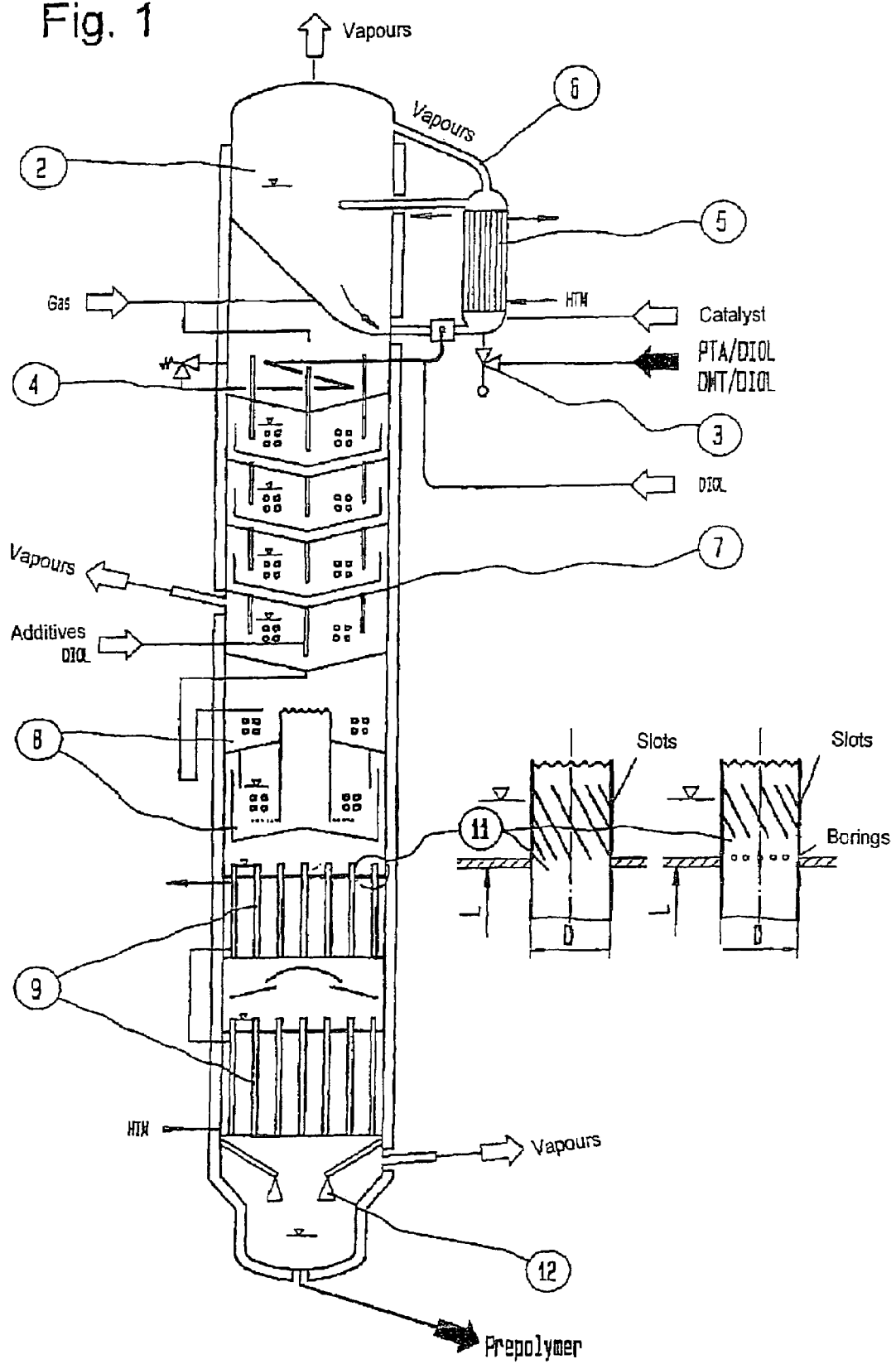

| | | | |
|---|---|---|---|
| 7,115,701 B2 * | 10/2006 | Schultz Van Endert et al. ........................ | 528/271 |
| 7,259,227 B2 * | 8/2007 | Schulz Van Endert et al. ........................ | 528/279 |
| 2005/0163679 A1 | 7/2005 | Schulz Van Endert et al. | |

FOREIGN PATENT DOCUMENTS

| | | |
|---|---|---|
| DE | 10155419 | 5/2003 |
| EP | 0 719 582 A2 | 7/1996 |
| GB | 2 184 129 A | 6/1987 |
| WO | WO 03/042278 * | 5/2003 |
| WO | WO 2005/042615 A1 | 5/2005 |

OTHER PUBLICATIONS

English language translation of International Preliminary Report on Patentability (previously cited in German language).

KIPO official action dated Mar. 31, 2009 in related Korean application 10-2006-7008052, in English.

* cited by examiner

TOWER REACTOR AND USE THEREOF FOR THE CONTINUOUS PRODUCTION OF HIGH MOLECULAR WEIGHT POLYESTERS

CROSS REFERENCE TO RELATED APPLICATIONS

This application is a U.S. national counterpart application of international application Ser. No. PCT/EP2004/012297 filed Oct. 29, 2004, which claims priority to German Patent Application No. 10351085.0 filed Oct. 31, 2003. The disclosures of both of these are hereby incorporated herein by reference.

The invention relates to a tower reactor and the use thereof for producing high-molecular weight polyesters, such as e.g. polyethylene terephthalate (PET), polybutylene terephthalate (PBT), polynaphthalene terephthalate (PEN), polytrimethylene terephthalate (PTT) and/or polyesters of other dicarboxylic acids and diols including copolymers thereof. It thereby concerns a single-stage tower reactor.

Methods for continuous production of polyesters are known from the state of the art, in which multiple-stage reactor systems are used which comprise three to five different reaction vessels which are connected to each other. In the case of these methods, the polyester formation is implemented in a plurality of reaction steps which are generally configured as stirred tanks, which steps proceed spatially separately from each other: esterification, transesterification, precondensation, polycondensation and polyesterification. The reaction conditions for the esterification are thereby at temperatures between 200 and 280° C. and pressures between 0 and 4 bar, whilst the conditions for the transesterification are normally at atmospheric pressures and also at temperatures between 150 and 240° C., dependent upon the initial substances, especially upon the diols. Low temperatures and low pressures are desirable for the methods in order to avoid undesired secondary reactions.

A method for continuous production of high-molecular weight polybutylene terephthalate is known therefore from DE 35 44 551 A1, in which the method is implemented at atmospheric pressure.

It is important with all the methods known from the state of the art to fulfil the following conditions:

I) Suitable process control and configuration of the devices in order to avoid undesired secondary reactions.
II) As rapid as possible removal of the byproducts, such as e.g. water, methanol, THF and acetaldehyde, as a result of which the reaction equilibrium is moved towards the side of the products and the main reaction consequently proceeds with precedence.
III) Gentle treatment, i.e. short dwell time with a minimum reaction temperature.
IV) Optimally coordinated pressure reduction or respectively temperature increase in order to achieve the greatest possible progress of the esterification/transesterification and also of the polycondensation/polyesterification.
V) High surface formation for improving the reaction kinetics.

These objectives can be fulfilled only unsatisfactorily by means of a plurality of successively connected stirred tanks which are used normally according to the state of the art for these processes. Consequently, e.g. the quality of the product or the quantity of undesired byproducts and also the yield can be affected negatively, as a result of which, in addition to further disadvantages, such as energy consumption, maintenance requirements and investment costs, the economic efficiency of the method is greatly impaired.

Furthermore, a method for production of high-molecular weight polyester and a device for implementing this method is known from DE 101 55 419, the individual reaction zones being integrated in a single reactor vessel.

Starting from these disadvantages of the state of the art, it was the object of the present invention to provide a reactor in which the individual reaction steps can be implemented and which makes possible a more rapid reaction progress and also a more gentle production of the reaction products relative to the state of the art.

This object is achieved by the generic tower reactor with the characterising features of claim 1 and also the use thereof with the features of claim 31. The further dependent claims reveal advantageous developments.

According to the invention, a tower reactor for continuous production of high-molecular weight polyester is provided which has reaction zones for simultaneous esterification and/or transesterification and also precondensation. The individual reaction zones are thereby combined in one tower reactor and can be connected to at least one reactor for polycondensation in the solid and/or liquid phase.

The tower reactor is thereby constructed in the following manner: in the upper third, the tower reactor is configured in the form of a hydrocyclone with an attached heat exchanger and has a supply line for the paste, the suspension and/or the liquid raw material mixture. The region of the tower reactor below the hydrocyclone is thereby configured in the form of a downflow cascade. This cascade is connected via a suitable inlet pipe to the lower part of the tower reactor which is configured in the form of a single- or multiple-stage falling-film zone with preliminary pressure reduction.

This type of construction confers various advantages. Thus the product discharge from the entire tower reactor can be ensured by means of gravimetric flow without the use of a pump. Furthermore, long external pressure lines for the conveyance of the monomer into the reactor are superfluous. Further advantages relate to the fact that the heating of the upper reactor cover is dispensed with, which leads to corresponding cost savings, and also that the reaction vapours can be used partially for heating the reaction product in the hydrocyclone. Likewise a uniform pressure incline prevails across the entire reactor. This leads to the fact that the wall material thickness can be reduced.

Preferably, the hydrocyclone has a vapour connection piece and is connected in the upper part of the tower reactor to a heat exchanger. As a result, it is made possible to direct the product in a natural or enforced circulation via the heat exchanger into the hydrocyclone.

In an advantageous embodiment, the heat exchanger has a separate gas chimney which leads into an upper part of the cyclone.

Preferably, the cascade has at least two, particularly preferred four reaction trays. A stirring assembly can thereby be integrated in at least one cascade region in order to assist the input of diol or additives. Alternatively, the additive can also be added into a product discharge pipe of the penultimate tray via an injection lance, as a result of which optimal distribution of the same in the product material is ensured.

The pressure pipe is configured preferably as a double-walled jacket pipe which continues in the interior of the first top tray as a heating coil. The pressure pipe can thereby be equipped with a volume feed pump and static mixing elements or a mixing pump.

Preferably, the hydrocyclone has a gas inlet in its conical region.

In an advantageous embodiment, one of the top trays in the vapour region likewise has an inert gas inlet. The reaction gases and/or foreign gases are preferably directed from reaction zone to reaction zone through the reaction liquid in parallel flow by means of dipped supply lines, as a result of which a pressure incline is produced between the trays. The reaction material is supplied centrally by means of a likewise dipped pipe to the respective next tray.

Preferably, the preliminary pressure reduction zone for the falling-film zone has likewise the form of a hydrocyclone which supports the flash effect and ensures suitable separation of the liquid/gas phases and also a further pressure step graduation.

The supply of the product from the preliminary pressure reduction zone to the falling-film zone is effected by suitable configuration of the discharge therefrom in the concentric outer region of the falling-film zones and the product is distributed uniformly in the pipe field via channels.

It is likewise preferred that the falling-film zone has at least one pipe field. An inlet cylinder is thereby assigned to each pipe of the pipe field, which inlet cylinder ensures uniform wetting of the inside of the pipe, the latter being equipped with overlapping, non-axial slots on the circumference, a constant filling level above the series of pipes being produced because of the slot pressure loss and having a maximum overflow with an indented crown, the slots being configured such that viscosity differences cause only negligible changes in the filling level, but in fact a proportional change of filling level to liquid throughput.

It is likewise preferred that the length of the falling-film pipes is dimensioned such that total wetting is effected.

Preferably, the diameter of the falling-film pipes is chosen to be larger than the largest occurring reaction vapour bubble. The reaction vapours are thereby directed in parallel flow with the downwardly flowing product.

The falling-film pipe field can preferably be used also for heat transference.

Preferably, the entire tower reactor is equipped with a jacket for heating with organic heating media in vapour form.

Preferably the tower reactor has a plate base valve configured with a special plate as supply line. The supply line of the raw mixture is disposed centrally in the spherical base below the heat exchanger. This confers the advantage that the plate of the base valve causes an impact plate effect which makes possible a uniform turbulent distribution of the raw mixture with the reaction mixture.

Preferably the tower reactor has static mixing elements in order to improve mixing of the raw mixture into the reaction mixture. Due to the complete or partial filling of the heat exchanger pipes, mixing of the raw mixture into the reaction mixture is improved. As a result, the reaction can be accelerated due to the higher material exchange and because of the improved heat exchange (lower wall temperature) the reaction product is protected.

The raw mixture which enters in the lower part of the heat exchanger which is situated externally undergoes an intensive mixing into the liquid reaction mixture. The ratio of circulating reaction mixture to introduced raw mixture is in the range of 100:1 to 300:1, so that satisfactory mixing is ensured already by the dilution when starting with a 100% mixture.

Particularly preferably, a three-dimensional static mixing element is used which produces a multiplicity of diagonal cross-flows with simultaneous axial through-flow before the reaction mixture enters the heat exchanger. Thus problems such as strand formation of the raw mixture in the reaction mixture can be excluded, so that a reaction which is starting non-homogenously in the heat exchanger, which would interfere with the natural circulation, can be prevented. In this way, sedimentation of a raw material component, which can lead to process interferences in the course of time, can likewise be avoided. These problems of mechanical mixing can be eliminated by means of commercial stirring elements or mixing pumps, these however have the disadvantage that a further element which requires maintenance and electrical power is a component of the reactor and hence reduces the economic efficiency of the process. In this connection, the use of a three-dimensional static mixing element has proved particularly advantageous. With the latter, radial distribution of reaction mixture and raw mixture with simultaneous axial upwards movement can be effected, i.e. intensive mixing of the components and hence a uniform reaction is effected. In a particularly preferred embodiment, the three-dimensional static mixing element comprises cross-wise assembled, perforated sheet metal sections, the inclination of which relative to the axis is adjusted such that the impact-pressure loss is only a few mmWWS/m. The ratio of axial height to heat exchanger diameter is thereby preferably between 0.2:1 to 0.5:1. This ratio is important in order to interfere with the natural circulation as little as possible.

For mixing, also defined types of filler bodies can be used. These however frequently ensure only limited, local axial mixing.

A further variant of mixing is produced by means of folded layer packing, as is used frequently in distillation columns. Good results can likewise be achieved herewith with respect in fact to the cross-wise and diagonal flow, the axial leakage flow and also the low pressure loss.

Preferably the heat exchanger has two regions, a product chamber and a heating chamber, and also a separating device for horizontal separation of these two regions, the height of the separating device being at least 1D (D=diameter of the heat exchanger pipes) and the separated regions of the heat exchanger having a rotated offset of 0 to 1D.

Preferably, the individual heat exchanger regions have a different pipe division.

In an advantageous development, the vapour chambers have adhesion-reducing coatings. For this purpose there can be used for example adhesion-reducing organic and inorganic chemicals as coatings in the thin film process (up to 10 μm) at a high application temperature of up to 350° C. With this surface treatment, a reduction in susceptibility to soiling of the polymer reaction materials can be achieved.

In a further advantageous embodiment, all the heat exchanger surfaces are equipped in the individual zones for fluid heat carriers for process-relevant temperature and heat quantity distribution.

With the reactor according to the invention, a method for continuous production of high-molecular weight polyesters can be implemented, based on the esterification of dicarboxylic acids and/or transesterification of dicarboxylic acid esters with diols in the presence of catalysts with simultaneous formation of a prepolymer and polycondensation thereof into high-molecular weight polyesters. The following steps thereby characterise the course of the method:

a1) A paste and/or a suspension of the dicarboxylic acids and of the diol is produced, a molar ratio of diol to dicarboxylic acid of 0.8 to 1.8 being maintained. At the same time, the temperature is maintained between 20 and 90° C. and the pressure between 0.1 and 1 bar.

a2) Alternatively to a1), a dicarboxylic acid ester can be melted and mixed with the diol in a molar ratio of diol to dicarboxylic acid ester of 1.2 to 1.8 at a temperature of 145 to 165° C.

b) The products from a1) and/or a2) are supplied continuously to a tower reactor. In the tower reactor, the esterification or respectively transesterification is then effected continuously, simultaneously and without interruption until precondensation, the following reaction conditions being maintained:

b1) The products from a1) and/or a2) are subjected to a temperature treatment at 170 to 270° C. and pressures of 0.3 to 3 bar. At the same time, a partial quantity of the catalyst and/or catalysts is supplied, whilst the reaction vapours are removed in situ from the reaction mixture.

b2) The product obtained from b1) is transferred continuously into a pipe stretch and the pressure is thereby maintained between 1 and 10 bar, the temperature between 200 and 280° C. In this reaction step, at the same time, 0.03 to 0.3 mol diol are supplied.

b3) The product from b2) is transferred continuously into a third zone, a reduced pressure of 0.1 to 2 bar and a temperature between 230 and 280° C. being maintained. 0.02 to 0.2 mol diol and a partial quantity of the catalyst and/or catalysts are supplied in this third step.

b4) The product from b3) is subjected to a further reaction, the pressure being maintained between 0.01 and 0.1 bar and the temperature between 240 to 280° C.

b5) The reaction product water from the esterification or respectively methanol from the transesterification, the byproducts and also excess diol from the reaction steps b1) and b3) to b5) are removed and the diol is supplied again to the individual process steps after cleaning.

c1) The prepolymer obtained from b4) is further processed in a normal polycondensation apparatus at temperatures between 240 and 290° C. and at pressures between 0.0002 to 0.003 bar continuously into the polymer.

c2) Alternatively to c1) it is also possible to solidify the obtained prepolymer, to process it into pellets and to subject it to subsequent condensation in a solid phase at temperatures between 160 and 230° C. under inert gas.

The new method allows the parallel, uninterrupted progress of the transesterification/esterification and also of the precondensation of dicarboxylic acids and esters thereof with diols in a single tower reactor. As a result, the mechanical and process-technological integration of a plurality of process steps is made possible for the first time for the polyester synthesis.

Preferably, the gaseous byproducts produced in step b1) and the excess diol are separated by means of a hydrocyclone in "statu nascendi". There is great significance in the rapid separation of more easily boiling reaction gases with respect to minimising the formation of byproducts by auto- and acid catalysis. The content of byproducts in the reaction material is determined, on the basis of the partial pressures of these products, by the applied reaction pressure and the static product levels present: the higher the total pressure, the higher the formation of byproducts. The configuration as hydrocyclone with externally situated heat exchanger is therefore decisive for a short dwell time of the byproducts in the reaction material because of the ensuing thermosiphon circulation, in the case of increasing static product level and because an immediate effective degassing in the hydrocyclone and in the heat exchanger is ensured.

During implementation of an esterification, preferably a temperature between 200 and 270° C. and a pressure between 0.3 and 3 bar is maintained in step b1). If in contrast a transesterification is implemented, then step b1) is implemented at a temperature between 170 and 200° C. and at a pressure between 0.3 to 1 bar.

In step b2), during implementation of an esterification, the pressure is maintained preferably between 2 and 6 bar, the dwell time between 1 and 5 min and the temperature preferably between 220 and 280° C. and particularly preferably between 230 to 250° C. If in contrast a transesterification is implemented, the pressure in step b2) is maintained preferably in the range between 2 and 5 bar, the dwell time between 1 and 4 min and the temperature in the range between 200 and 240° C., particularly preferably between 210 and 230° C.

In an advantageous development of the method, in step b3), the reaction product supplied continuously from step b2) is directed over a downflow cascade, a pressure falling by 20 to 60 mbar and a temperature increasing by 5 to 20° C. being set per tray. During the esterification, a precondensate is thereby produced with 5 to 20 repeat units with a conversion between 97 and 99.5%. During the transesterification, the conversion is however between 98.5 and 99.8%.

Preferably, in addition to the normal process gas, a dry inert gas and/or superheated process gas is directed into at least the first tray below the reaction material surfaces. As a result, the separation of the byproducts is assisted by "entrainment effect", i.e. saturation of the gases. At the same time, the internal intermixing of the reaction material is favoured.

The dwell time in the individual trays is preferably in a range between 5 and 15 min.

In a further advantageous development of the method, the supply of product is effected centrally in the trays. The product thereby discharges at the outer edge of the trays distributed uniformly over the outer wall, which serves for accelerated degassing, and subsequently is directed together again centrally.

The step b4) is configured as a falling-film zone with preliminary pressure reduction and is implemented preferably at a temperature between 245 and 270° C. and a dwell time between 4 and 30 min, and also at a pressure between 0.01 and 0.05 bar. A precondensate is thereby produced with 10 to 40 repeat units with a conversion of 99.8%.

The reaction product is directed together after leaving one or more falling-film zone(s) preferably through a heated cone, a gas-liquid separation being undertaken in its central region by means of spoilers.

Preferably, 1,4-butanediol, ethanediol or propanediol is used as diol. The method is also suitable for cyclohexane dimethanol. Terephthalic acid is used preferably as dicarboxylic acid. During transesterification, preferably dimethyl terephthalate (DMT) is used as dicarboxylic acid ester. There are used as catalysts preferably the known tin, antimony, germanium, manganese, calcium and/or titanium metals etc., in particular as organic compounds thereof. The catalysts can also be accommodated in a porous carrier substance in order to develop a specific effect.

The subject according to the invention is intended to be explained in more detail with reference to the following Figures and the example, without being restricted to these embodiments.

Figure 2:
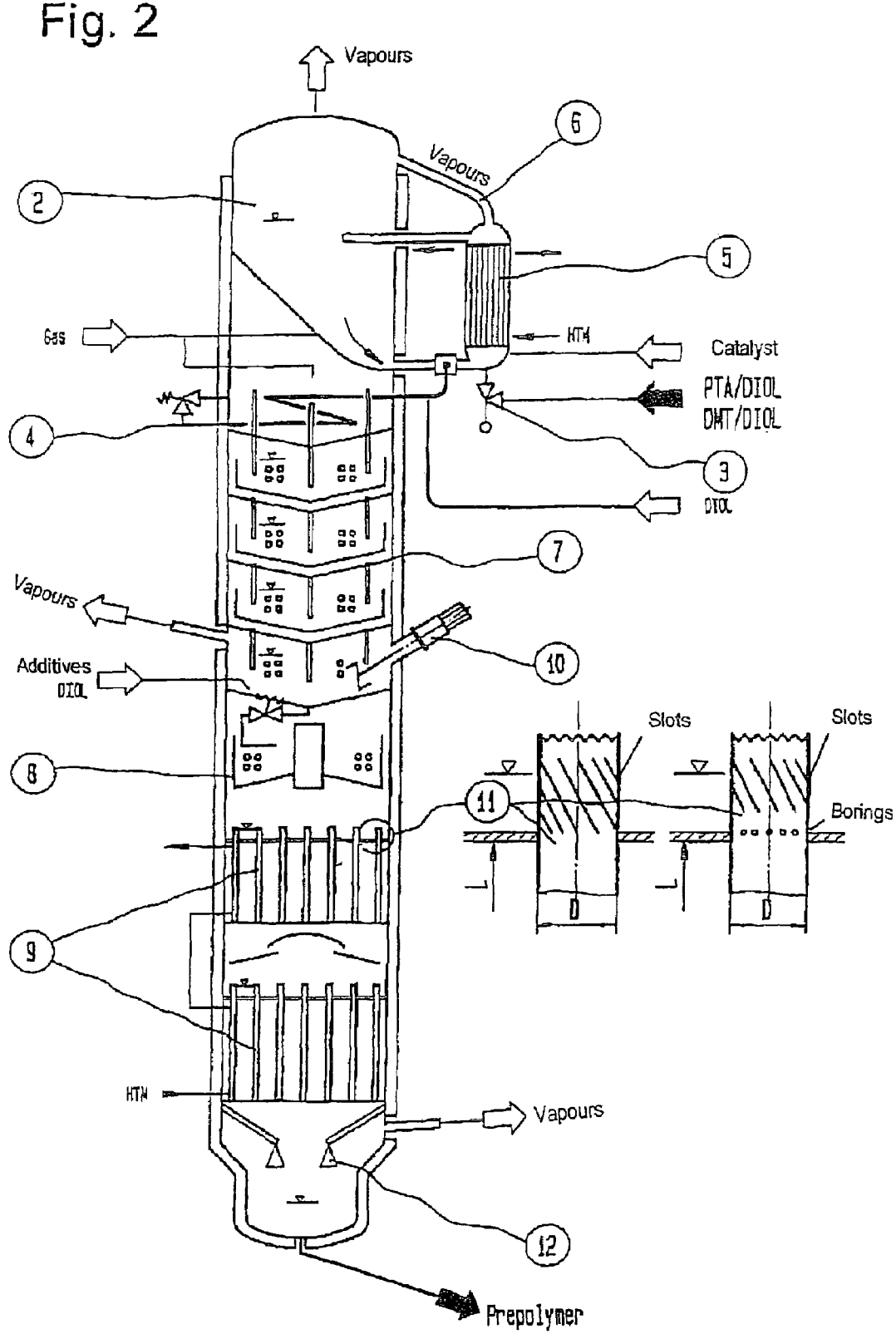
Figure 3:
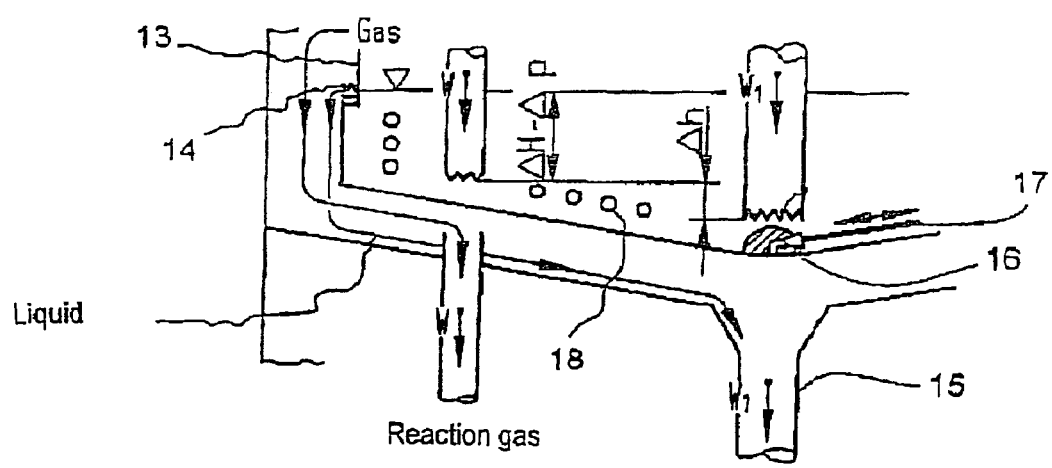
Figure 4:
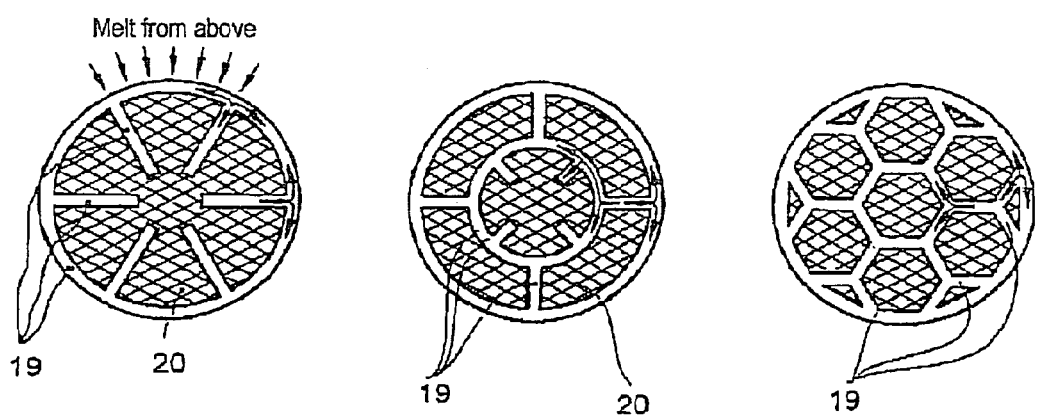
Figure 5:
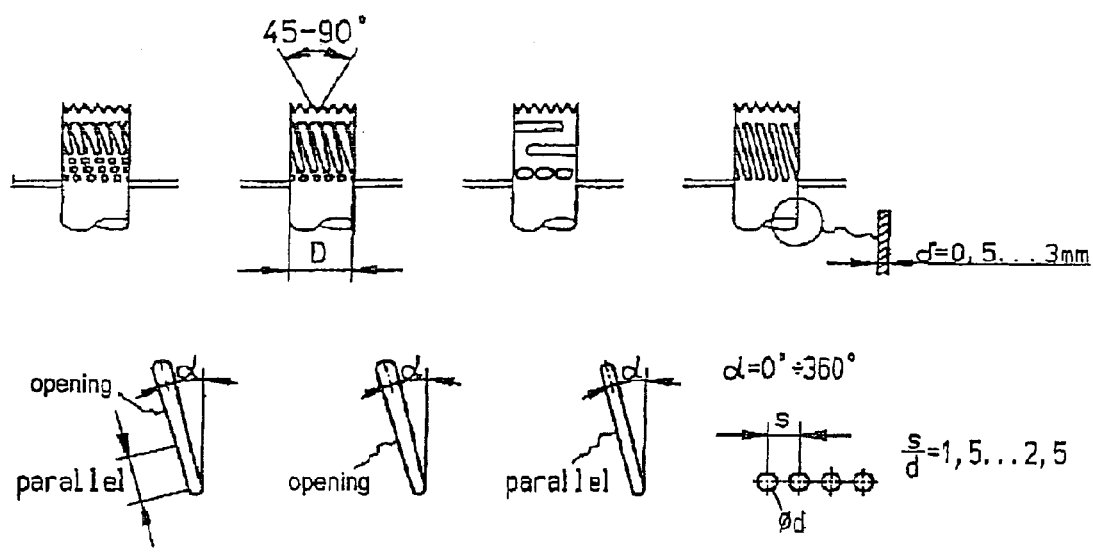
Figure 6:
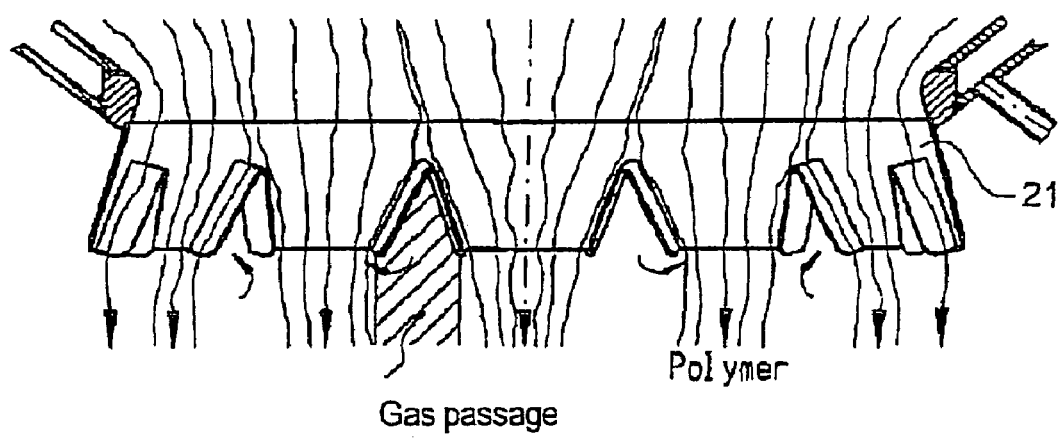
Figure 7:
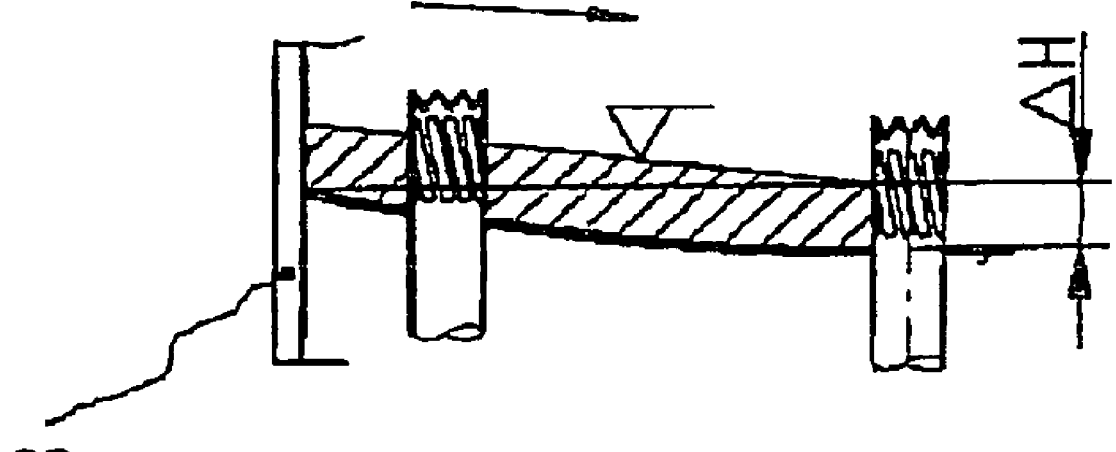

FIG. 1 shows a first variant of a tower reactor according to the invention,

FIG. 2 shows a second variant of a tower reactor according to the invention, FIG. 3 shows a reaction tray with foam brake 13 and vapour/liquid separation, FIG. 4 shows various embodiments of the pipes of the pipe field, FIG. 5 shows various embodiments of the cylindrical inlet pipes, FIG. 6 shows an embodiment of the discharge of the second film reaction zone, and FIG. 7 shows an embodiment of the pipe bases in the form of a cap.

FIG. 1 shows the schematic structure of a tower reactor. A suspension of the dicarboxylic acid with the diol or the molten dicarboxylic acid ester and the diol are injected under pressure into the reaction material in the lower region of a heat exchanger 5 suspended on the tower reactor, the result being, due to suitable configuration of the injection connection piece 3, optimal intermixing with the boiling reaction product located in the lower part. Also a catalyst, which is advantageous for some polyester reactions, can be fed in here. The heat exchanger ensures the heating of the mixture to the boiling temperature of the reaction. The boiling reaction mixture passes via a short connection pipe which discharges tangentially into a hydrocyclone 2 for further reaction. For rapid reaction gas discharge from the reaction material, the main part of these gases is directed via a separate pipe, a vapour chimney 6, out of the heat exchanger into the gas chamber of the cyclone.

A further degassing during continuation of the reaction takes place in the hydrocyclone 2. The reacted product passes via a short connection pipe at the foot of the cyclone back into the heat exchanger 5 so that a natural circulation is produced. The entire reaction gas is withdrawn above the reaction material from the vapour chamber of the hydrocyclone 2.

In the case of particularly sensitive products, such as e.g. in the production of PBT, undesired tetrahydrofuran (THF) is produced by cyclisation of butanediol. The formation is increased by the presence of water which is produced for example during esterification. Advantageously, a preheated, unsaturated entrainment gas or superheated process vapour can be introduced in this case in the lower region of the cyclone, as a result of which the removal of, in particular water, methanol, acetaldehyde or tetrahydrofuran from the reaction material is accelerated.

The reactor has a pressure pipe for the product, into which the diol is mixed intimately with the reaction material via static mixing elements. According to the product, a pressure here of up to 10 bar can be set via a pressure maintaining valve. Alternatively, the intermixing and the pressure can also be produced by a special mixing pump.

By introducing the diol under pressure, a spontaneous conversion with the carboxyl- or methoxy groups is initiated, which proceeds in the time range of 1 to 5 minutes and is ended after pressure reduction to atmospheric or sub-atmospheric pressure. The reaction time is adjusted in that a part of the pressure pipe is disposed in the form of a heating coil in the uppermost reaction tray of the tower reactor. The double-walled jacket ensures that the reaction material cooled by pressure reduction is brought again to reaction temperature.

The pressure-reduced reaction material is now conducted through a downflow cascade 7 which comprises at least 2, preferably 4 to 5, reaction trays fitted with heating coils, into which the product flows centrally and dipped under the surface. The reaction gas is in contrast conducted separately out of the tray situated respectively thereabove by means of likewise dipped pipes through the reaction material. A differential pressure, which acts preferably as a pressure reduction from tray to tray from top to bottom is produced herefrom.

The product from the second to $x^{th}$ tray runs respectively on the outer wall, which acts as an additional evaporation face, to each tray in a conically shaped collector, the discharge of which is located centrally at the deepest point of the cone. In the collector, there are also located the dip pipes which introduce the reaction gas into the next tray. The trays are preferably designed for a dwell time of 5 to 10 min in order to achieve the desired reaction progress. In order to control the reaction temperature, preferably a gentle increase by 2 to 10° C. per tray, each tray is equipped with heating coils.

It results from the arrangement that the reaction gas is directed in parallel flow with the product stream, the gas bubbling through the reaction material and, on the one hand, ensuring there optimum intermixing, on the other hand, not achieving its saturation limit because of the pressure decrease with simultaneous temperature increase and consequently remaining absorbent for newly forming reaction gas (entrainment effect). A further important effect of the described downflow cascade is that the low-boiling, short-chained oligomers of the product, which are initially still present, are directed back into the reaction material with the reaction gas and there take part further in the reaction. Due to the introduction of the gas into the reaction material, by additional surface formation and contact with the gaseous diol, the bubble formation further promotes the speed of the reaction.

This is not possible for example in the case of stirred cascades and as a result the yield is reduced and interferences are caused in the subsequent condensers and vacuum devices.

Insofar as it is required for mixing additional additives or diol, a diagonally pitched stirrer 10 can be disposed in the last tray, which stirrer assists intermixing of the vapour bubbles.

The reaction material is brought subsequently by a suitable supply line for renewed pressure reduction into an arrangement configured similarly to a hydrocyclone, which arrangement is equipped like the previous trays with heating coils for temperature control. The gas/liquid separation is effected on the surface, it being ensured by suitable baffles that the reaction material discharges uniformly over the indented outer edge of the tray, unaffected by forming reaction gas bubbles. The reaction material discharging at the periphery is collected on a pipe base—likewise on the periphery thereof—and is distributed on the base uniformly with the assistance of so-called "channels".

The pipe base is part of a straight pipe bundle 9 which serves simultaneously for film formation on the inner pipe faces and for heat exchange. An inlet cylinder 11 is assigned to each pipe in the bundle (cf. FIG. 5). Said inlet cylinder is configured with a series of non-axial, overlapping slots with a particularly aligned geometry at its periphery. The geometry is established such that a minimum level for all pipes is maintained for uniform liquid distribution, only small level differences occur for a specific viscosity spectrum, throughput changes effect a proportional level change and the inner pipe face is wetted uniformly over the entire pipe length, the upper edge of the inlet cylinder 11 serves as an emergency overflow and is equipped with an indented crown.

The pipe diameter is chosen such that it is greater than the largest possible occurring reaction gas bubble. The reaction vapour is directed in parallel flow with the downwardly running product film. The ratio of pipe length to pipe diameter should be between 10 and 25 and the surface of the falling-film pipes must be adapted to the wettability of the product. The product emerges as a film and/or strands on the underside of the falling-film pipes, is directed together by conical collector sheets which allow the gas flow to pass through and is supplied to a second falling-film reaction zone on the periphery. The latter is in principle configured identically to the first zone but takes into account the increased viscosities by means of corresponding measures on the inlet cylinders 11, distribution of the pipes and length of the module.

Below the module, a device is located for directing together the melt which contains in the center a central pipe for the guidance of the reaction gases and the product. The product discharging at the device, preferably at the wall, is separated from the gas flow by a spoiler device 12 (cf. FIG. 6), which gas flow is deflected and discharged in the gas chamber of the integrated prepolymer collector. The collected prepolymer is removed from the collector at the reactor base after a resting and secondary reaction time of 5 to 15 minutes and can now be subjected to a further treatment, e.g. granulation with subsequent solid phase post-condensation or a melt phase post-condensation.

For specific products, the possibility is provided of directing back a partial flow of the prepolymer into the lower falling-film module and of mixing it with the preproduct from the upper falling-film module so that the reaction time can be advantageously increased in a simple manner.

The outer covering of the reactor is equipped with a heating jacket which is provided preferably with a synthetic heat carrier vapour as active insulation for the heating. The temperature profile required for the reaction is produced essentially with a liquid heat carrier oil in zones by means of the inner heating faces. The reaction gases from the different zones are discharged through normal devices, such as condensers, columns and vacuum systems, the diol with small proportions of oligomer being essentially directed back into the process.

FIG. 2 shows a further variant of the tower reactor which has the essential elements as in FIG. 1.

However, in this variant of the tower reactor, a special mixing pump is used instead of the pressure maintaining valve and the static mixing elements. Likewise in this variant, the use of a diagonally pitched stirrer for mixing additional additives and diols is dispensed with.

FIG. 3 shows an embodiment of the reaction tray with foam brakes and vapour-liquid separation. The reaction trays represented here have a foam brake 13 and also an adjustable, indented overflow 14. The liquid is directed through the reaction gases and can discharge via the central liquid discharge (dip pipe) 15, which serves for producing differential pressure. Simultaneously, the reactor tray has a closeable drainage opening 16 which comprises a drilled hole with a conical machining, into which a conical closure with an additional temperature-resistant sealing element is introduced. The actuation is effected from the outside with the help of a two-fold vacuum-sealed rod 17. Furthermore, the reaction trays have heating pipes 18.

The ratio $$\frac{\Delta H}{\Delta h}$$

is preferably between 2 and 10, the liquid velocity W is between 1 and 5 m/s and W1 between 0.05 and 0.3 m/s.

FIG. 4 shows the distribution of the melt on the distributor bases from the periphery with the help of gases 19 in the pipe field 20, which ensure a distribution deviation of at most 30%, i.e. the throughput difference between two pipes with maximum spacing is not higher than 30%. For formation of the channels, three different embodiment variants are represented.

FIG. 5 shows different embodiments of the cylindrical inlet pipes 11 for the film-producing pipes in order to achieve an optimal film discharge. The indentation angles of the overflow can thereby be between 45 and 90° and the height of the indentations between 5 and 20 mm. The ratio of the spacing between the borings s to the diameter d of a boring $$V = \frac{s}{d}$$

is between 1.5 and 2.5.

According to the course of the chemical reaction and the resulting physical values, the gap/hole geometry is determined by a suitable differential equation, a minimum level height, which is required for optimal distribution, being maintained.

FIG. 6 shows an embodiment of the discharge of the second film reaction zone in the form of a spoiler 21.

The product from this zone already has a melt viscosity which has film and fibre-forming properties. The discharge of such a melt from a pipe can already adopt the form of an elastic hose. In the case of the passage of a gas, in this case the reaction gas, the danger exists that this film hose will be ripped apart and flat parts of the same will pass with the gas flow into subsequently connected condensation and vacuum systems. This would lead to unsatisfactory operational interferences and losses. According to the invention, this problem was resolved by bundling of the polymer flow, which then only discharges in strands through the pipe, with simultaneous release of the gas passage faces with the help of the spoiler 21.

FIG. 7 shows an embodiment variant of the pipe bases in the form of a cap. In order to assist the uniform supply to the peripheral pipes and the subsequent pipes of the pipe surface up to the central pipes, the pipe bases can have the configuration of a cap, by means of which a targeted height difference in the fluid level is produced. As a result, the distribution irregularities which arise on the base due to the material difference and pressure loss of the material are eliminated and the uniform supply of all pipes on the base is achieved. ΔH hereby corresponds to the natural level decrease in the case of the flow from the exterior, i.e. from the reactor wall 22, to the interior.

EXAMPLE

1. A paste, which is temperature-controlled to 20-90° C., made of the reactants PTA and diol or the liquid carboxyester and diol with a temperature of 150° C. in the case of molar ratios between 0.8 and 1.8 are injected into a first chamber, are mixed intensively with the existing monomer/prepolymer reaction material in the heat exchanger with product recirculated from the hydrocyclone and at least one catalyst.
2. Degassing by removing the byproducts in an order of magnitude between 30 and 90%, preferably 40 and 60% "in situ" whilst passing through the heat exchanger which directs the reaction vapours into the hydrocyclone via a "chimney" channel (gas/liquid separation).
3. The reaction material is further degassed in a connected hydrocyclone at pressures between 500 to 3000 hPa.
4. Injection of a carrier gas at the base of the hydrocyclone for a further improved removal of byproducts. Any inert medium or one of the purified gaseous byproducts (superheated) can be used as carrier gas.
5. Transference of the reaction material through a pipe under pressure and simultaneous addition of parts of the diol to the material in quantities between 0.03 to 0.5 mol/mol acid or respectively dimethylester, preferably between 0.1 and 0.3 mol/mol acid or respectively dimethylester in order to achieve an immediate reduction of the carboxyl groups or an exchange of ester end groups between 20-80%, preferably 40-60%, of the acid or ester end groups present in the hydrocyclone.

6. Transference of the reaction material into a first tray in order to remove the previously formed byproducts and to heat the reaction material again by means of the heating jacket of the pipe under pressure in the container.

7. The product is directed through at least two or a plurality of vapour-stirred integrated trays with a dwell time of between 5 and 15 min, the temperature increasing constantly in steps of 1 to 20° C. and the pressure being reduced constantly by 5 to 50 hPa per tray. The vapours produced by continuing the reaction are in a non-saturated gaseous state and are introduced below the liquid surface of the following tray, whilst the product flows into the following container in a liquid-impermeable manner. The vapours promote the removal of the reaction side products by intensive mixing with the primary product. In addition, dried inert gas or process gas can be admitted into the first tray in order to further improve the reaction progress by saturation of vapour and gas. The obtained reaction progress is between 10 and 40% for the simultaneous reactions between carboxyl and hydroxyl groups as well as ester end groups.

8. The product is transferred into a further flash container in which a pressure which is smaller by ⅕ to 1/50 than in the last vapour-stirred container prevails and the reaction temperature is increased by 2 to 20° C. The resultant polyesters have a chain length of 5-20, preferably between 10 and 15 repeat units with a conversion of more than 99.5%.

9. Allowing the polyester to flow through at least one high surface-active pipe field in which each partial quantity of product is subjected uniformly to the temperature and surface, from which a prepolymer results which has preferably between 20 and 35 repeat units and a conversion of 99.8%. The superheated reaction gases are directed downwardly in parallel flow with the polymer films and absorb each newly occurring gaseous byproduct of the polymer films. This arrangement enables implementation of the method with the above conditions in a period of time between 5 and 30, preferably 8 and 16 min.

10. In order to equalise the molecular distribution, the product remains in the system between 2 and 10 min.

11. The polymer is transferred into a polycondensation reactor in which a PD of 80-150 is achieved. A suitable reactor is described for example in U.S. Pat. No. 5,779,986 and in EP 0 719 582.

12. Alternatively, the product pumped out after 2 to 10 min can be processed into a granulate which can be heat treated further then in the solid state in order to obtain a polymer with a PD of 90-200.

Both polymers produced according to point 1-11 and also point 1-10 and point 12 are excellently suited to fibre-forming processes, as resin for bottle applications, in particular for "still waters" and for film-forming and industrial plastic material application.

They are distinctive inter alia because of a degree of yellowness improved by up to 2.5 points measured according to CIELAB (b* value) and in a degree of whiteness improved by up to 5 points (L* value).

These analyses indicate inter alia that, relative to polymers produced in previously common methods and equipment, this concerns polyesters of high purity.

The device according to the invention presents therefore, relative to the state of the art, a new concept which is progressive in its features.

The invention claimed is:

1. A tower reactor comprising reaction zones for simultaneous esterification and/or transesterification and also pre-condensation, the individual reaction zones being connected to each other and combined in the tower reactor, wherein the at least one tower reactor is constructed as follows: in the upper third, the tower reactor is configured in the form of a hydrocyclone with attached heat exchanger and has a supply line for the paste, suspension and/or liquid raw material mixture, the region of the tower reactor below the hydrocyclone is configured in the form of a downflow cascade, the cascade is via a pipe in connection with the lower part of the tower reactor which is configured in the form of a single- or multiple-stage falling-film zone with a preliminary pressure reduction.

2. The tower reactor according to claim 1 wherein the hydrocyclone has a vapor connection piece and is connected to a heat exchanger in such a manner that the product is directable in the natural or enforced circulation via the heat exchanger into the hydrocyclone.

3. The tower reactor according to claim 1 wherein the heat exchanger has a separate gas chimney which leads into an upper part of the cyclone.

4. The tower reactor according to claim 1 wherein the cascade has at least two trays.

5. The tower reactor according to claim 4 wherein a stirring assembly for mixing additives is in at least one cascade region.

6. The tower reactor according to claim 4 wherein the penultimate cascade has a discharge pipe on which an injection lance for the supply of additives is disposed.

7. The tower reactor according to claim 1 wherein the pressure pipe is configured as a double-walled jacket pipe which is continued in the interior of the first top cascade as a heating coil.

8. The tower reactor according to claim 1 wherein the pressure pipe is equipped with a volume conveyor and static mixing elements or with a mixing pump.

9. The tower reactor according to claim 1 wherein the hydrocyclone has a gas inlet in a conical region thereof.

10. The tower reactor according to claim 1 wherein one of the reaction trays in the vapor region has an inert gas inlet.

11. The tower reactor according to claim 1 wherein the preliminary pressure reduction zone for the falling-film part has the form of a hydrocyclone.

12. The tower reactor according to claim 1 wherein the preliminary pressure reduction zone is equipped with at least one further pressure reduction chamber.

13. The tower reactor according to claim 1 wherein the at least one falling-film zone has a pipe field.

14. The tower reactor according to claim 1 wherein an inlet cylinder is assigned to each pipe of the pipe fields and ensures uniform wetting of the insides of the pipes, the pipes being equipped with overlapping, non-axial slots on the circumference, a constant filling level above the series of pipes being producible because of the slot pressure loss, and having a maximum overflow with an indented crown, the slots being configured such that viscosity differences effect no change in the filling level, but a proportional change of filling level to liquid throughput.

15. The tower reactor according to claim 13 wherein the pipe field has channels for distribution of the melt.

16. The tower reactor according to claim 13 wherein the pipes have a cold-rolled, drawn surface "m" according to EN ISO 1127 with a surface roughness $R_a$=0.4 to 0.6 or $R_t$ 4 to 6 µm.

17. The tower reactor according to claim 13 wherein the pipe bases are configured in the form of a cap.

18. The tower reactor according to claim 13 wherein the length of the pipes of the falling-film zone is dimensioned such and the inner surfaces have such a structure that total wetting is effected as a function of the product viscosity (L:D≧10≦25).

19. The tower reactor according to claim 13 wherein the diameter of the pipes of the falling-film zone is chosen to be larger than the largest occurring reaction vapor bubble and in that the reaction vapors are directed in parallel flow with the downwardly flowing product.

20. The tower reactor according to claim 1 wherein the tower reactor has dipped supply lines for the reaction gases and/or foreign gas from reaction tray to reaction tray for conducting in parallel flow through the reaction liquid in order to produce a pressure incline between each tray.

21. The tower reactor according to claim 1 wherein the entire tower reactor is equipped with a jacket for heating with organic heating medium in vapor form.

22. The tower reactor according to claim 1 wherein all the heat exchange surfaces in the individual zones are equipped for liquid heat carriers for process-relevant temperature-and heat quantity distribution.

23. The tower reactor according to claim 1 wherein the tower reactor has a plate base valve with flow-directing formation with which the supply of the raw materials is effected centrally from below.

24. The tower reactor according to claim 1 wherein the heat exchanger has static mixing elements in order to improve mixing of the raw mixture into the reaction mixture.

25. The tower reactor according to claim 1 wherein the heat exchanger has a three-dimensional static mixing element for producing diagonal cross-flows with simultaneous axial through-flow.

26. The tower reactor according to claim 25 wherein the three-dimensional static mixing element has cross-wise and diagonally configured sheet metal sections with carrier and retaining frames in the flow direction.

27. The tower reactor according to claim 26 wherein the sheet metal sections are at least one of perforated, undulating, folded and pleated.

28. The tower reactor according to claim 1 wherein the heat exchanger has a heating chamber and a product chamber and also at least one separating device for horizontal separation of heating chamber and product chamber, the height of the separating device corresponding at least to the diameter of the heat exchanger pipes and the separated heat exchanger regions having a rotated offset which corresponds at most to the diameter of the heat exchanger pipes.

29. The tower reactor according to claim 28 wherein the individual separated heat exchanger regions have a different pipe division.

30. The tower reactor according to claim 1 wherein the hydrocyclone includes one or more vapor chambers, and the vapor chambers are coated in an adhesion-reducing manner.

31. A method for continuous production of high-molecular weight polyesters by at least one of esterification of dicarboxylic acids and transesterification of dicarboxylic acid esters with diols in the presence of catalysts with formation of a prepolymer and polycondensation thereof to form high-molecular weight polyester, the method comprising providing a tower reactor comprising reaction zones for at least one of simultaneous esterification and precondensation and simultaneous transesterification and precondensation, the individual reaction zones being connected to each other and combined in the tower reactor, constructing the tower reactor as follows: configuring the upper third of the tower reactor in the form of a hydrocyclone with an attached heat exchanger and a supply line for at least one of a paste raw material mixture, a suspension raw material mixture and a liquid raw material mixture, configuring the region of the tower reactor below the hydrocyclone in the form of a downflow cascade, the cascade is via a pipe in connection with the lower part of the tower reactor, and configuring the lower part of the tower reactor in the form of one of a single-stage falling-film zone with a preliminary pressure reduction and a multiple-stage falling-film zone with a preliminary pressure reduction.

* * * * *